United States Patent
Drasny et al.

(10) Patent No.: US 7,506,287 B2
(45) Date of Patent: Mar. 17, 2009

(54) METHOD, SYSTEM, AND PROGRAM PRODUCT FOR PRE-COMPILE PROCESSING OF HARDWARE DESIGN LANGUAGE (HDL) SOURCE FILES

(75) Inventors: Gabor Drasny, Poughkeepsie, NY (US); Gabor Bobok, Niskayuna, NY (US); Ali El-Zein, Austin, TX (US); Fadi Zaraket, Austin, TX (US); Hussein Sharafeddin, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 11/521,917

(22) Filed: Sep. 16, 2006

(65) Prior Publication Data

US 2008/0072187 A1    Mar. 20, 2008

(51) Int. Cl.
*G06F 17/50* (2006.01)
(52) U.S. Cl. .................................. 716/4; 716/1; 716/18
(58) Field of Classification Search ...................... 716/1, 716/4, 18
See application file for complete search history.

(56) References Cited

U.S. PATENT DOCUMENTS 7,299,458 B2 * 11/2007 Hammes ..................... 717/133

* cited by examiner

*Primary Examiner*—Thuan Do
(74) *Attorney, Agent, or Firm*—Lynn L. Augspurger; Graham S. Jones, II; Richard M. Goldman

(57) ABSTRACT

A method includes pre-compilation operations on HDL source code files, creating a "make it" file, on demand processing of the HDL source code in an HDL source browser, and resolving overloaded function and operator calls in an HDL source code browser debugger. Construct a list of all HDL files a list of HDL files to be processed. Send an HDL file in the list for compiling. If compilation is successful, branch to add the HDL file to an end of target file and that HDL file is removed from the list. The list is tested for remaining files and then a next file in the list is sent for compiling. After all files in the list have been processed, the HDL files which have been processed are checked for failures to compile and if any of said HDL files to be processed have failed to compile the method branches back to repeating the process until all runs are successful.

20 Claims, 2 Drawing Sheets

METHOD, SYSTEM, AND PROGRAM PRODUCT FOR PRE-COMPILE PROCESSING OF HARDWARE DESIGN LANGUAGE (HDL) SOURCE FILES

BACKGROUND

1. Field of the Invention

This invention relates to Hardware Design Language (HDL) tools for the design of circuit components and for determining the performance and logical correctness of the designed circuit components. Hardware Design Languages and HDL tools transform high-level designs (e.g., functional specifications or functional-level logic such as Boolean expressions, truth tables, or standard macro logic) into its hardware implementation, and model the target system to predict its performance analyze its behavior.

2. Background Art

The state-of-the-art in hardware design is to utilize a Hardware Description Language (HDL), such as VHDL (Very-High-Speed Integrated Circuits HDL) or Verilog (Verify Logic) HDL. The HDL design file consists of a hierarchical structure of modules using a set of predefined library constructs and routines. In order to compile the design, preprocessing of the HDL source file is required. Preprocessing includes creating a bottom-up list of related file names. This list is needed by the compiler so that the required parts (modules and libraries) can be located and fetched. This shows a need for a method to create this list, also known as the "makefile", automatically and with minimal user intervention.

Manual creation of this "makefile" list requires that a designer visually inspect each source file and create the needed hierarchy. This works for small designs; however, it becomes a tedious task very quickly especially when multiple designers are involved and over an extended period of time.

Automatic creation of the "makefile" is a parsing operation that is done starting at the top-level (highest in hierarchy) HDL source code wherein the needed lower-level modules are identified by detecting language-specific keywords that instantiate those entities, i.e.represent those entities as an abstract concept by a concrete instance. Although this will generate a top-down list of required module and routine names, the actual file names stored on disk are usually different, especially when a file contains multiple modules. Therefore another search is done inside all HDL source files of a defined path to look for the module definitions, and again, using language-specific keywords. The "Makefile" is thus created in a top-down fashion as each hierarchy level is done. The process has to go through the lower level files recursively repeating that process until all needed definitions are located.

Automatic creation of the "Makefile" requires extra programming, knowledge of the file name containing the top-level module, and is time consuming with large designs due to the special HDL source code parsing required. Additionally, automatic creation of the "Makefile" requires a special script for each hardware design language.

Semi Automatic creation of the "Makefile" is similar to Automatic creation of the "Makefile" but instead of searching through files for module definitions, the file base names are required to be the same as the module name.

Semi Automatic creation of the "Makefile" has some drawbacks, including imposing module and file names, that is, it requires the designer to match module and file names although language naming rules are usually different than those of the operating system. Additionally, each source file is restricted to either one module definition, or to be self-contained in the module hierarchy. Additionally, semi automatic creation of the "Makefile" does not work on non-conforming designs (such as legacy or external source code) unless the files are modified.

A further feature of hardware description language (HDL), such as VHDL or Verilog is the need for and capability of pre-compilation debugging of the source code file. To help in debugging, design automation vendors provide HDL source browsers that perform a variety of debugging functionalities, such as:

1—Simulation value annotation: Signal values obtained from a simulation database are annotated back to the HDL source.
2—Syntax highlight: Different token types (keywords, comments, identifiers, etc) are highlighted in different colors.
3—Semantic navigation: Semantic navigation involves tracing through the code from a signal usage jump to its declaration or its type declaration, list all sources and sinks of a signal, from a VHDL entity jump to its architecture, hierarchy navigation, etc.

One of the most important capabilities of semantic navigation in an HDL language is the hierarchy navigation. From a top level module, a lower level module is instantiated along with the connections to its ports (inputs, outputs, inputs). Current Vendor source browsers require the HDL to be compiled before getting displayed, resulting in performance and usability problems. These problems include first, all of the HDL code needs to be compiled although the user is only interested in viewing few modules, and second, in a large project it is not always possible to have access to all the VHDL files.

Thus, a need exists for s pre-compilation solution for alleviating the above two limitations by compiling the instantiated modules on-demand.

Another issue is with overloading operators and functions. Both VHDL and Verilog support overloading operators. The built in operators can be extended to accept operands of any types. For example the user can overload the "+" operator to add a record to an array and return an integer. Although this is a powerful feature, it makes browsing the HDL very complicated especially for nested expressions. Both languages also support overloading user defined functions, in which the same function name is used with different operand types. Current Vendor source browsers help the user in browsing the HDL by displaying the list of all operators and functions that are visible at the point of the operator or function usage. It leaves to the user the task of matching the operator usage to the list of operators, which exponentially increases in complexity with the number of operators and the nested level of the expressions. This illustrates a further need for a technique that allows browsing HDL operators and functions in a very simple and helpful way.

SUMMARY OF INVENTION

The method, system, and program product of the invention described herein obviate the above deficiencies of the prior art through pre-compilation operations on HDL source code files, including creating a "make it" file, on demand processing of the HDL source code in an HDL source browser, and resolving overloaded function and operator calls in an HDL source code browser debugger.

According to the method of out invention, the HDL analyzer (compiler) is run on the needed HDL files without particular order and checks the result. If the run is unsuccessful due to a missing module name, the file will be visited again later. If it is unsuccessful because of a coding error, it gives the designer an early chance to fix it, i.e., before attempting to compile a large source file. Otherwise, a small file is saved on disk by the name of the defined module so that the analyzer recognizes it if needed later. After all files are attempted, those that failed will be visited again until all runs are successful.

This is generic for all HDL languages, with only a minimal programming script needed. No previous knowledge of top file name is needed, and there are no file naming or content restrictions imposed. Moreover, the method disclosed herein presents no challenge to legacy or external source code, and detects syntax errors early on. The saved files minimize future searches when the design is partially or incrementally modified, and the estimated average time consumption is $O(n2)$.

A further aspect of the pre-compilation processing method of our invention is the capability of navigating the design hierarchy on-demand. According to this feature, when the user asks to browse an HDL file, the selected file is compiled. However for every module that is instantiated, the compiler will not resolve the binding of the instantiation to other HDL modules, but rather will store the information about the instantiation, its port connections and the context of the instantiation in a way that can be easily retrieved. Later when the user points to an instantiation or to a port map of an instantiation and select to jump to the module corresponding to the instantiation or the port declaration of the instantiated module, the compiler will process the stored data and resolve the instantiation. Only those modules that are navigated by the user will be compiled, and the user will be able to view the files that he is interested in irrespective of whether he has access to the rest of the files in the design hierarchy.

A still further aspect of the method disclosed herein is providing the capability of navigating HDL expressions. By clicking on the operator or the function call, the user will get the option of jumping to either the function declaration or the function body corresponding to the operator or function call. Selecting that option will result in jumping directly to the function declaration or body, irrespective if this function is inside an architecture, entity, module, or a package. There is no need for the user to match expressions to a list of operators and function calls which increases exponentially in complexity with the number of operators and function calls as well as the nested level of expressions.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The pre-compilation steps in creating a compiled HDL file include one of more of creating a make file, selective examination of HDL source code through on demand processing with a source browser and analysis of operator calls for over loaded operators in a source browser and debugger. For purposes of illustration we consider a make file, where the process starts with a "to do" file.

A to-do file contains all HDL source files that are needed for a design without any particular order, and a target "makefile" that is initially empty. A shell script can run this process as follows: it submits one file name from the to-do file to the HDL analyzer and waits for it to finish. If the run is successful, the file name is appended to the target Makefile and removed from the to-do list. If the run is unsuccessful, this implies that the file contains lower design parts that have not been analyzed yet; hence, it will remain in the to-do file. When the running script reaches the end of the to-do file, it re-visits it and checks for any left-over file names. This repeats until the to-do file is empty.

Figure 1:
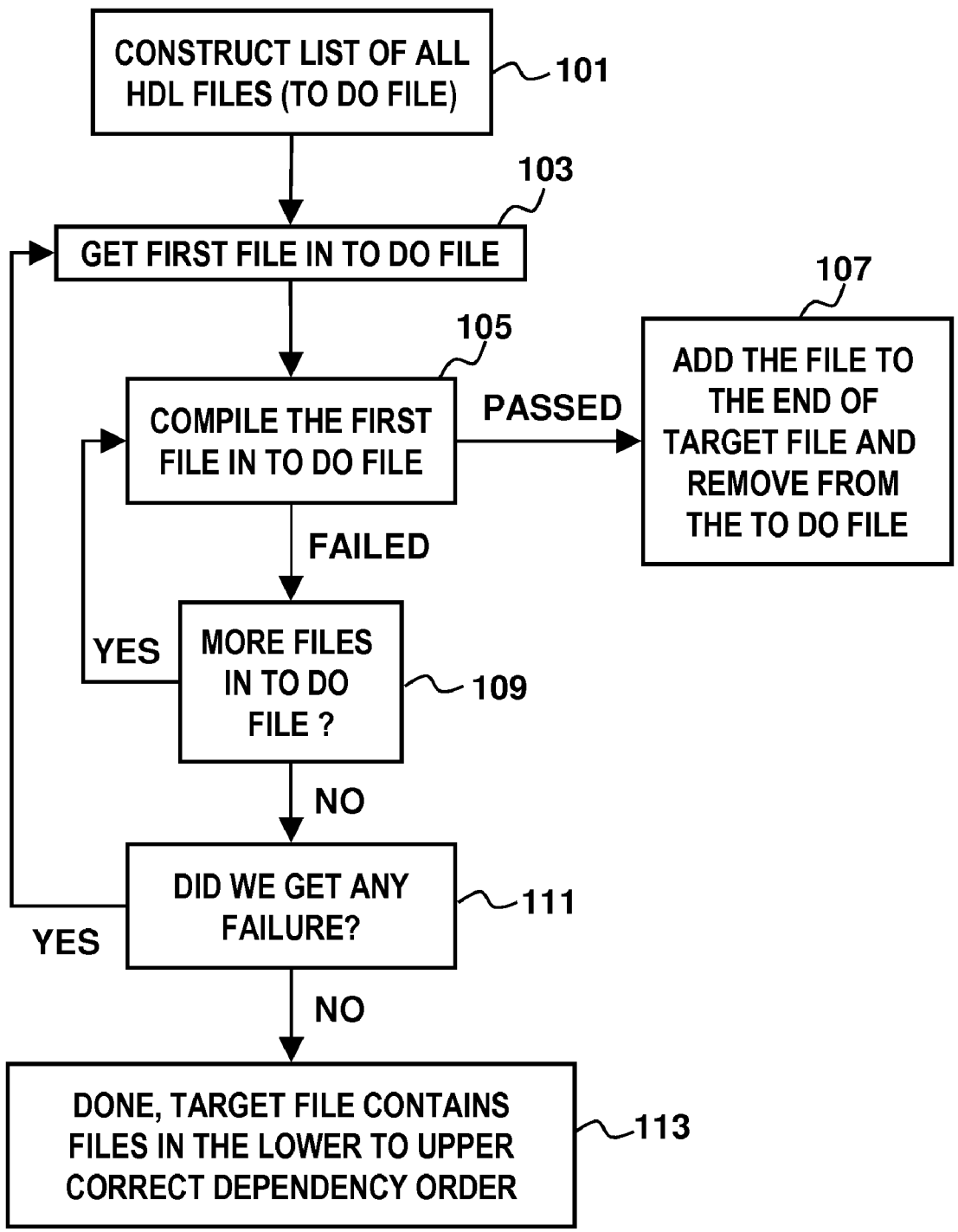
FIG. 1 illustrates a high level flow chart for the method, system, and program product of the invention.

This is shown in FIG.1, which illustrates a high level flow chart of the steps of the method of the present invention. The method starts by constructing a list of all HDL (Hardware Design Language) files, a "to do"list of HDL files to be processed 101. The next step is getting the first file in the "to do" list of HDL files to be processed from step 101 in step 103 and compiling a first HDL file in step 105. If compilation in step 105 is successful, the method branches to step 107 in which the first HDL file is added to the end of the target file and removed from the "to do" list of HDL files.

The "to do" list is tested for remaining files 109. Then the next remaining file in the "to do" list of HDL files is sent for compilation in step 105. After all the HDL files in the "to do" list of HDL files have been processed. the processed HDL files are checked for failures to compile in step 111, and if there any failures to compile the method branches back to step 103 to repeat the process of compiling the HDL files from the "to do" list of HDL files in step 103. In other words, the next HDL file is called from the "to do" list of HDL files for compilation from the "to do" list of HDL files starting with the "to do" in step 103.

If step 111 determines that there are no remaining files that failed to compile, and there are no more files in the "to do" list of HDL files 103, the target file contains files in lower to upper correct dependency order in step 113. As stated above, the HDL analyzer (compiler) 105 is run on the needed HDL files 103 without a particular order and checks the result. If a file in the run is unsuccessful due to a missing module name, the file will be visited again later. If the compiling of a file is unsuccessful because of a coding error, it gives the designer an early chance to fix it, i.e., before attempting to compile a large source file. Otherwise, a small file is saved on disk by the name of the defined module so that the analyzer recognizes it if needed later. As indicated above, after processing of all files has been attempted, those that failed will be visited again as determined by step 111 until all runs are successful to the degree indicated above.

On demand processing and hierarchal navigation of the source code in an HDL source browser is a step in pre-compilation processing. Consider the following VHDL code where an entity e1 is instantiated from an entity gen1.

```
library ieee;
use ieee.std_logic_1164.all;
entity gen1 is
    generic(g1: integer := 2);
    port (i1, i2: in std_logic;
        o: out std_logic);
end;
architecture gen1 of gen1 is
    signal x,y,z: std_logic;
begin
    x <= i1;
    y <= i2;
    l1: entity work.e1 port map(in1 => x, in2=> y, out1 => z);   o <= z;
end;
```

The instantiated e1 entity is located in a VHDL file that is either accessible to the user or not. The e1 declaration is as shown:

```
library ieee;
use ieee.std_logic_1164.all;
entity e1 is
    port (in1,in2: in std_ulogic;
        out1: out std_ulogic);
end;
architecture e1 of e1 is
begin
    o1 <= i1 or i2;
end;
```

According to one embodiment of the invention, it is not necessary to process the instantiation of e1 when it is encountered, but to store information that e1 is instantiated along with the context of the instantiation (at which place, inside an architecture or a block, etc). Also in the port map, in1, in2 and out1 are ports that are supposed to be declared in the entity e1, but since at this point we are not processing the instantiation, we need to store these ports and resolve them later when processing the instantiation.

There are two semantic navigation functions that a user can do with an instantiation:
1. Point to the label of the instantiation (l1 in this case) and ask to jump to its entity or architecture.
2. Point to a formal port (in1, in2 or out1 in this case) and ask to jump to its declaration in the instantiated entity.

In either case, the compiler needs to locate the entity e1 and display it in the source window browser. The compiler will retrieve the stored information for the e1 instantiation and try to locate and compile the entity e1s. If successful, the HDL file containing the entity e1 will be displayed. If not, an error message will be issued and the user will be able to continue either by moving on to other commands or fixing the problem on-the-fly. For example if the user forgot to set the env variable for locating the HDL source to point where the entity e1 is located, he can either
1. Open a dialogue window in the source browser and append the path where the file containing e1 is located to the appropriate env variable.
2. Go back and perform the previously failed operation.

One of the side effects of the on-demand processing is in displaying the sources and sinks of signals. In the example above, if the user, before processing the instantiation, asked to display the sources and sinks of the signal x, it is obvious that the reference of x in "x<=i1;" is a source. On the other hand, the reference of x in the instantiation statement (in1=>x) is not known before processing the instantiation. It is unknown at this point if in1 is an input, output or inout. A new category "connected to unresolved port" is added for this purpose. Whenever an instantiation is processed the sink-source list of the signals connected to the ports of the instantiated entity is updated.

A further aspect of pre-compilation processing includes analysis of overloaded operators. This is done by resolving overloaded function and operator calls in an HDL source code browser debugger. This is illustrated by the following VHDL code:

```
-- file p1.vhdl
library ieee;
use ieee.std_logic_1164.all;
package p1 is
    function f1(a: bit) return std_ulogic;
    function "+"(a:std_ulogic; b: bit) return std_ulogic;
end;
package body p1 is
    function f1(a: bit) return std_ulogic is
    begin ................ ................ end;
    function "+"(a: std_ulogic; b: bit) return std_ulogic is
        begin
................ ................ end;
end;
-- file p2.vhdl
package p2 is
    function f1(a: std_ulogic) return bit;
    function "+"(a:bit; b: bit) return std_ulogic;
end;
package body p2 is
    function f1(a: std_ulogic) return bit is
    begin ................ ................ end;
    function "+"(a: bit; b: bit) return sd_ulogic is
        begin
................ ................ end;
end;
-- file gen1.vhdl
library ieee;
use ieee.std_logic_1164.all;
use work.p1.all;
use work.p2.all;
entity gen1 is port (i1, i2: in bit;
        i3   : in
std_ulogic;
        o    : out std_ulogic);
end;
architecture gen1 of gen1 is
    signal x,y,z: std_logic;
begin
    o <= f1(f1(i1) + i2) + f1(i3);
end;
```

If the user has only the list of functions and operators that are visible at the assignment to the output o, he has to switch between the three files (p1.vhd1, p2.vhd1 and gen1.vhd1) and manually match the function and operator calls to their corresponding declarations, and if he did not make a mistake he will reach the conclusion that the first f1 and second f1 calls (parsing left to right) correspond to the function in the package p2 and the third corresponds to the function in the package p1. On the other hand, the first "+" corresponds to the declaration in the package p1 and the second in the package p2.

The method of this invention:
1. Tokenizes the HDL expressions. All f1's and +'s in the example above will become different tokens.
2. Associates actions with the function and operator calls that include at least two actions:
   1. Jumping to the function declaration
   2. Jumping to the function body All the user needs to do to figure out the corresponding function declaration or body of a function call or an operator is to point to it and select the required action, which will result in jumping to the place where the declaration or body is located, even if it is in different file. For example picking the first f1 call in the example above and selecting the action "Go To Body", will result in the browser opening the file p2.vhd1 and pointing to the line:

function f1(a: std_ulogic) return bit is

As can be seen, this can save the user time especially for nested expressions and alleviate the possibility of making errors; thus making debugging much easier.

Figure 2:
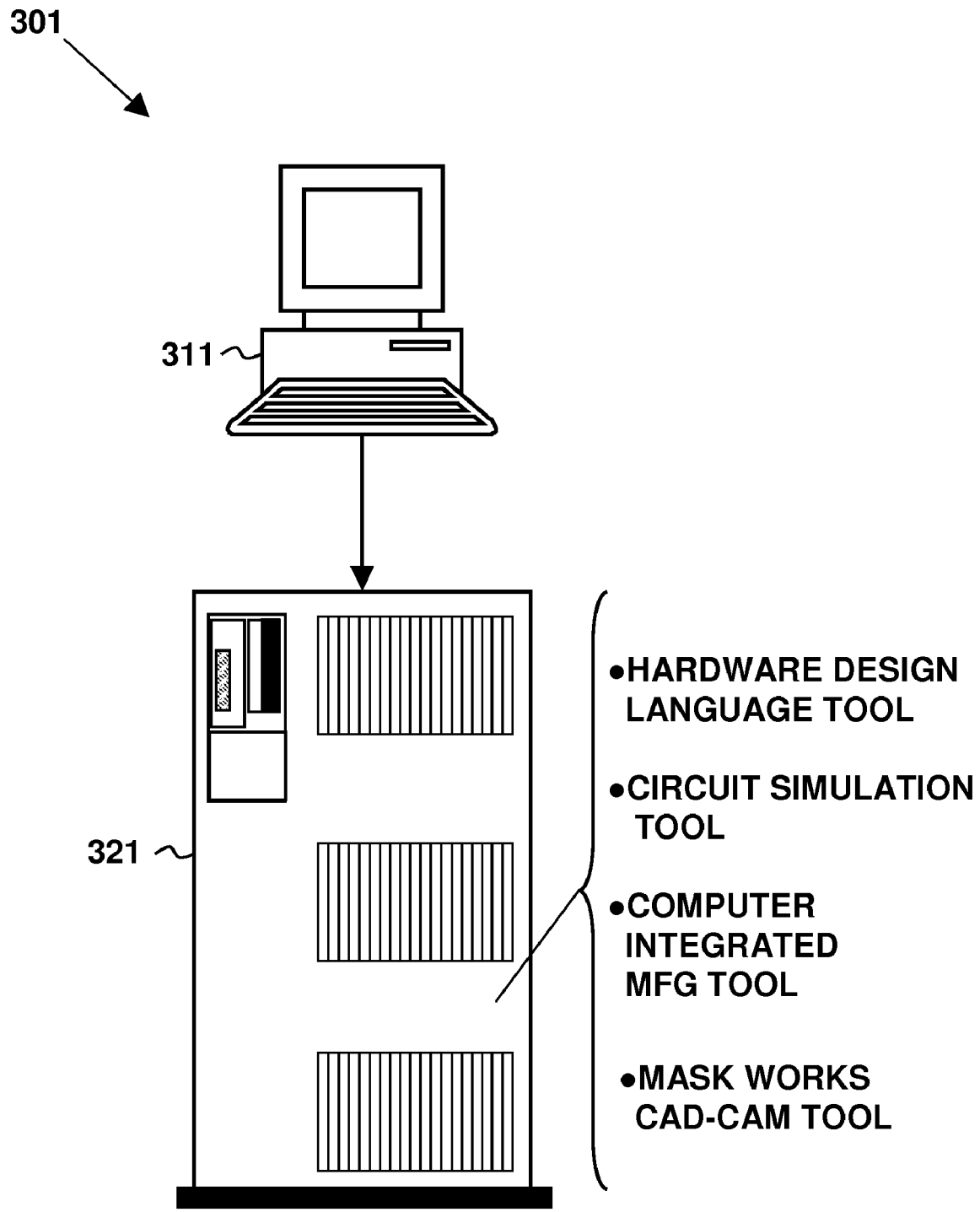
FIG. 2 illustrates a simplified diagram of the components of a design system including a user terminal and a server.

FIG. 2 illustrates one example of a system for practicing the method of the invention using the program product of the invention. The system 301 includes a user terminal 311, e.g., a work station, and an associated server 321, which may be connected directly or over a network. The associated server includes tools and applications such as (by way of exemplification and not limitation) a Hardware Design Language Tool, a Circuit Simulation Tool, a Computer Integrated Mfg Tool, and a Mask Works CAD—CAM Tool. Not shown are an operating system and system utilities, and links to associated equipment and fabrication tools may be included.

The invention may be implemented, for example, by having the system for pre-compilation processing including pre-compilation operations on HDL source code files, including creating a "make it" file, on demand processing of the HDL source code in an HDL source browser, and resolving overloaded function and operator calls in an HDL source code browser debugger executing the method as a software application, in a dedicated processor or set of processors, or in a dedicated processor or dedicated processors with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for by having the system for pre-compilation processing including pre-compilation operations on HDL source code files, including creating a "make it" file, on demand processing of the HDL source code in an HDL source browser, and resolving overloaded function and operator calls in an HDL source code browser debugger a software application.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A method of pre-compilation processing an HDL source code file comprising the steps as follows:
   a) construct a list of all HDL (Hardware Design Language) files to be processed;
   b) send a first HDL file in said list to be processed for compiling;
   c) then if compilation is successful, the method branches to add said HDL file to an end of the target file and said HDL file is removed from said list;
   d) test said list for remaining files and then a next remaining file in said list is sent for compiling; and
   e) then after all files in said list have been processed, said HDL files which have been processed are checked for failures to compile and if any of said HDL files to be processed have failed to compile the method branches back to step (b) which is run again by repeating the compiling of HDL files from said list until all runs are successful.

2. The method of claim 1 further comprising:
   a) compiling a selected HDL file wherein for every module that is instantiated, not resolving binding of the instantiation to other HDL modules, and storing instantiation information;
   b) subsequently processing the stored instantiation information and resolving the instantiation.

3. The method of claim 2 wherein the stored instantiation information includes port
   connections and instantiation context.

4. The method of claim 2 comprising:
   compiling only those modules that are navigated by a user, and
   providing access for the user to be able to view the HDL files that the user is interested in irrespective of whether the user has access to other files in the design hierarchy.

5. The method of claim 2 comprising:
   a) selecting an operator or function call including function declaration or function body corresponding to the operator or function call; and
   b) thereby jumping directly to the function declaration or body.

6. The method of claim 5 wherein the function is chosen from the group consisting of architectures, entities, module, and packages.

7. A program product comprising a computer readable medium having computer readable code thereon, said code carrying out a method of pre-compilation processing an HDL source code file including at least one of creating a "make it" file, on demand processing of the HDL source code in an HDL source browser debugger, and resolving overloaded function and operator calls in an HDL source code browser debugger comprising:
   a) constructing a list of all HDL (Hardware Design Language) files to be processed;
   b) sending a first HDL file in said list for compiling;
   c) then if compilation is successful, the method branches to add said first HDL file to an end of the target file and said first HDL file is removed from said list;
   d) said list is tested for remaining files and then a next remaining file in said list is sent for compiling; and
   e) then after all files in said list have been processed, said HDL files which have been processed are checked for failures to compile and if any of said HDL files have failed to compile, the method branches back to step (b) which will be run again by repeating the compiling of HDL files until all runs are successful.

8. The program product of claim 7 further comprising:
a) compiling a selected file wherein for every module that is instantiated, not resolving binding of the instantiation to other HDL modules, and storing instantiation information;
b) subsequently processing the stored instantiation information and resolving the instantiation.

9. The program product of claim 8 wherein the stored instantiation information includes port connections and instantiation context.

10. The program product of claim 8 comprising compiling only those modules that are navigated by a user, and the user will be able to view the files that the user is interested in irrespective of whether the user has access to the rest of the files in the design hierarchy.

11. The program product of claim 7 comprising:
a) selecting an operator or function call including function declaration or function body corresponding to the operator or function call; and
b) thereby jumping directly to the function declaration or body.

12. The program product of claim 11 wherein the function is chosen from the group consisting of architectures, entities, module, and packages.

13. A method of providing a debugging service for an HDL source code file in an HDL source code browser debugger comprising comprising the steps as follows:
a) constructing a list of all HDL (Hardware Design Language) files to be processed;
b) sending an HDL file in said list for compiling;
c) then if compilation is successful, the method branches to add said HDL file to an end of the target file and said HDL file is removed from said list;
d) said list is tested for remaining files and then a next remaining file in said list is sent for compiling; and
e) then after all files in said list have been processed, said HDL files which have been processed are checked for failures to compile and if any of said HDL files have failed to compile the method branches back to step (b) which is run again by repeating the compiling of HDL files from said list until all runs are successful.

14. The method of claim 13 further comprising:
a) compiling a selected file wherein for every module that is instantiated, not resolving binding of the instantiation to other HDL modules, and storing instantiation information; and
b) subsequently processing the stored instantiation information and resolving the instantiation.

15. The method of claim 14 wherein the stored instantiation information includes port connections and instantiation context.

16. The method of claim 14 comprising compiling only those modules that are navigated by a user, and the user will be able to view the files that the user is interested in irrespective of whether the user has access to the rest of the files in the design hierarchy.

17. The method of claim 13 comprising:
a) selecting an operator or function call including function declaration or function body corresponding to the operator or function call; and
b) thereby jumping directly to the function declaration or body.

18. The method of claim 17 wherein the function is chosen from the group consisting of architectures, entities, module, and packages.

19. A program product comprising a computer readable medium having computer readable code thereon, said code comprising compressed code and including executable code for effecting installation thereof on a target computer, after installation said code carrying out a method of pre-compilation processing an HDL source code file including at least one of creating a "make it" file, on demand processing of the HDL source code in an HDL source browser debugger, and resolving overloaded function and operator calls in an HDL source code browser debugger comprising:
a) constructing a list of all HDL (Hardware Design Language) files to be processed;
b) sending an HDL file in said list for compiling;
c) then if compilation is successful, the method branches to add said HDL file to an end of the target file and said HDL file is removed from said list;
d) said list is tested for remaining files and then a next remaining file in said list is sent for compiling; and
e) then after all files in said list have been processed, said HDL files which have been processed are checked for failures to compile and if any of said HDL files have failed to compile the method branches back to step (b) which will be run again by repeating the compiling of said HDL files from said list of HDL files to be processed until all runs are successful.

20. The program product of claim 19 further comprising code for decompressing the code and effecting installation thereof on a target computer, and after installation for instructing the target computer to:
a) compile a selected file wherein for every module that is instantiated, not resolving binding of the instantiation to other HDL modules, and storing instantiation information;
b) subsequently process the stored instantiation information and resolving the instantiation.

* * * * *